United States Patent
Grossmann et al.

(10) Patent No.: US 6,962,362 B2
(45) Date of Patent: Nov. 8, 2005

(54) AIRBAG MODULE HAVING AN ELASTICALLY MOUNTED GAS GENERATOR

(75) Inventors: Uwe Grossmann, Aschaffenburg (DE); Norbert Müller, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 164 days.

(21) Appl. No.: 10/401,144

(22) Filed: Mar. 28, 2003

(65) Prior Publication Data

US 2003/0214119 A1 Nov. 20, 2003

(30) Foreign Application Priority Data

Apr. 3, 2002 (DE) .......................................... 102 15 330

(51) Int. Cl.⁷ .............................................. B60R 21/16
(52) U.S. Cl. .................................... 280/728.3; 280/731
(58) Field of Search ............................. 280/728.2, 731

(56) References Cited

U.S. PATENT DOCUMENTS

| | | | |
|---|---|---|---|
| 5,826,901 A | 10/1998 | Adomeit | |
| 6,439,599 B1 | 8/2002 | Laue et al. | |
| 6,464,247 B1 | 10/2002 | Laue | |
| 6,783,149 B2 * | 8/2004 | Lovell et al. | 280/728.2 |
| 6,811,181 B2 * | 11/2004 | Hauer | 280/731 |
| 2002/0175500 A1 | 11/2002 | Heindl | |

FOREIGN PATENT DOCUMENTS

| | | |
|---|---|---|
| DE | 201 08 594 U1 | 9/2001 |
| DE | 201 05 733 U1 | 10/2001 |
| DE | 101 10 534 A1 | 9/2002 |
| DE | 101 10 912 A1 | 9/2002 |
| EP | 0 932 526 B1 | 8/1999 |
| EP | 1 020 332 A2 | 7/2000 |
| EP | 1 101 663 A2 | 5/2001 |
| JP | 9-301117 | 11/1997 |

OTHER PUBLICATIONS

Markus et al., "Air Bag Module for Automobile Steering Wheel," Japanese Abstracts of Japan, JP 2002–274312, Sep. 25, 2002, Abstract.

Markus et al., "Air Bag Gas Generator for Steering Wheel of Automobile," Japanese Abstracts of Japan, JP 2002–274311, Sep. 25, 2002, Abstract.

* cited by examiner

*Primary Examiner*—Eric Culbreth
(74) *Attorney, Agent, or Firm*—Foley & Lardner LLP

(57) ABSTRACT

An airbag module having an elastically mounted gas generator. An easily fittable, elastic mounting is provided for mounting the the gas generator in such a manner that it can be used irrespective of the shape of the diffuser or of another housing surrounding the gas generator. The gas generator is mounted by means of an elastic subassembly, which has retaining element running obliquely upward, i.e., obliquely in the direction of the covering, and retaining element running obliquely downward, i.e., obliquely in the direction opposed to the aforementioned direction. The two retaining elements are fastened to the gas generator or to a section of the airbag module.

25 Claims, 6 Drawing Sheets

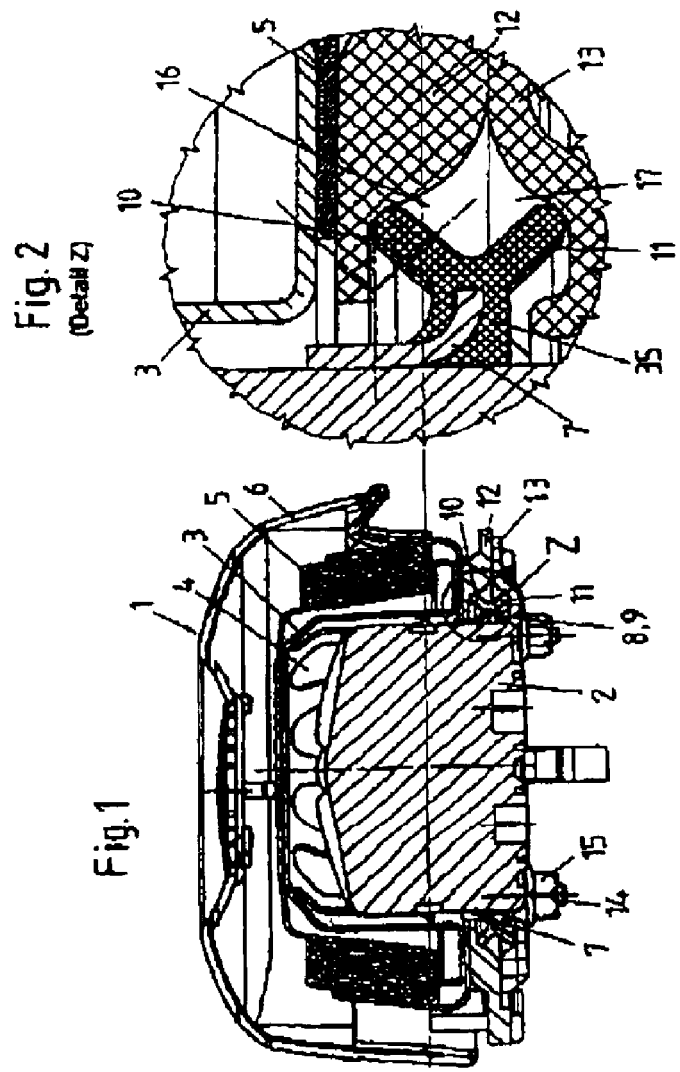

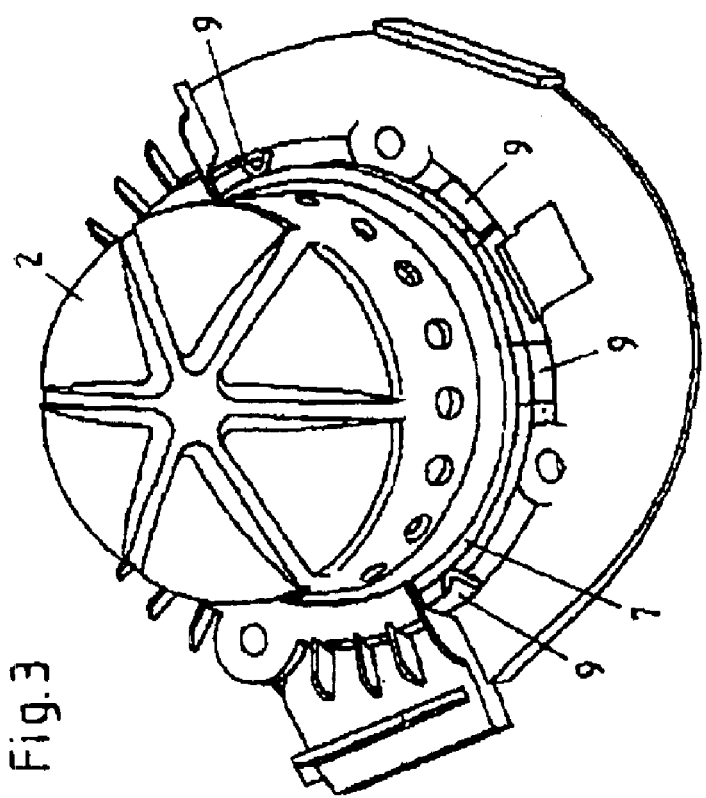

(Detail E)

AIRBAG MODULE HAVING AN ELASTICALLY MOUNTED GAS GENERATOR

BACKGROUND

The invention relates to an airbag module having an elastically mounted gas generator and, in particular, to an airbag module having an elastically mounted gas generator with an airbag and with a covering facing the passenger compartment, in particular for steering wheels.

Airbag modules having elastically mounted gas generators are preferably provided in steering wheels in order to reduce the tendency of the steering wheel to vibrate. The elastic mounting of the gas generator enables vibrations to be decoupled from the steering wheel. Given appropriate dimensioning of the gas generator, the gas generator may also be used as a vibration damper.

European Patent No. EP 1 020 332, hereby incorporated by reference, discloses an airbag module in which elastic bushings are provided in the region of the fastening screws of the gas generator. German Patent No. DE 201 08 594 U1, hereby incorporated by reference, discloses an airbag module in which the gas generator is retained by an elastic element without screwed connections being provided in the region of the element. The elastic element provided in this airbag module is a cross-sectionally closed hollow profile with a circumferential wall. The radial outer side of the wall rests on one side on the gas generator and on the other side on a retaining part on the module.

One way of securing the gas generator is achieved by the gas generator having a retaining flange with a respective elastic element resting on the upper and lower sides thereof, and by the elastic elements being pressed against each other by retaining parts.

Another way of securing the gas generator is by the gas generator having a retaining flange and an elastic element extending from the upper side of the flange and along the circumferential edge as far as the lower side of the flange, and by the elastic element being pressed against the upper and lower sides of the flange by retaining parts.

A disadvantage of this known airbag module is that a step-shaped diffuser must be provided in order to have a bearing surface for the upper elastic element or for the upper region of the single-part elastic element. However, in comparison to a cylindrical diffuser, a diffuser of this type is more difficult to produce and, in addition, the airbag loses structural space. A further disadvantage is that the annular elastic elements cannot be fixed in place.

SUMMARY

An object of the present invention is to design an easily fittable, elastic mounting of the gas generator in such a manner that it can be used irrespective of the shape of the diffuser or of the shape of the housing surrounding the gas generator.

According to an embodiment of the present invention, an airbag module having an elastically mounted gas generator is provided. The airbag module includes an airbag and a covering facing a passenger compartment. The gas generator is mounted by means of elastic subassembly, which has a retaining element running obliquely upward, i.e., obliquely in the direction of the covering. The elastic subassembly further includes a retaining element running obliquely downward, i.e., obliquely in the direction opposed to the aforementioned direction. The two retaining elements are fastened to the gas generator or to a section of the airbag module that is assigned to the gas generator and rest on the respectively other subassembly, i.e., the associated section of the airbag module or on the gas generator.

The advantage of this arrangement is that it can be used in the case of a conventional diffuser having a cylindrical wall, with it being ensured that it can be fitted easily. This diffuser can be produced more easily than a step-shaped diffuser. The airbag does not lose any structural space or folds. This arrangement also permits the airbag module to be constructed in a flat manner.

A plurality of segment-like, elastic subassemblies can be provided which are arranged at the same angular spacing from one another. When a plurality of elastic subassemblies are used, it is preferable to arrange at least three elastic subassemblies.

However, it is possible to provide an annular, elastic subassembly. A design of this type additionally ensures that there is a seal between the gas generator and the surrounding housing, with the result that no gas in the region of the securing of the gas generator can escape from the airbag module.

The retaining elements preferably have a finger-shaped cross section.

In another embodiment of the present invention, the elastic subassembly has the cross-sectional shape of a Y where the obliquely running branches of the Y constitute the retaining elements, which bear by means of the conventionally vertical section of the Y on the gas generator or are fastened to another component of the airbag module.

The elastic subassembly is preferably arranged in the lower part of the gas generator, the lower, conventionally vertical section of the Y running in the plane of a generator carrier or parallel to this plane, an oblique section of the Y being the retaining element which runs obliquely upward, and the other oblique section of the Y being the retaining element which runs obliquely downward. The elastic subassembly thus has a cross section in the form of a horizontal Y.

According to another embodiment of the present invention, the retaining element that runs obliquely upward engages in a depression of the generator carrier, and the retaining element which runs obliquely downward engages in a depression of a retaining plate connected to the generator carrier. In this embodiment, the elastic subassembly is arranged below the diffuser housing, with the result that the latter can be designed irrespective of the fastening of the gas generator.

The elastic subassembly may be fastened to flange connected to the gas generator. This flange may annularly surround the gas generator housing or, if a plurality of segment-shaped, elastic subassemblies are used, corresponding flange segments may also be provided.

The elastic subassembly may include, for example, rubber or silicone and is preferably injection molded onto the gas generator and/or onto the flange connected to the latter.

According to yet another embodiment of the present invention, the elastic subassembly is connected to a generator carrier, and the obliquely running branches of the Y engage in recess on the gas generator. According to this embodiment the elastic subassembly may have a cross section in the form of a horizontal Y.

According to still another embodiment of the present invention, provision is made for retaining element to be provided in the upper and lower regions of the gas generator. In this embodiment, the retaining elements are fastened to the gas generator, with the retaining element arranged in the upper region of the gas generator resting on a housing surrounding the gas generator, and with the retaining element arranged in the lower region of the gas generator resting on the housing and on a retaining plate. In particular, a diffuser housing is provided as the housing. The elastic subassembly is preferably designed in such a manner that it can be pulled over the gas generator. For example, the elastic subassembly may be in the form of a hood in which retaining elements are integrated. This embodiment affords the further advantage of it being possible to design the gas generator without a flange.

Since, in the case of this type of elastic mounting of the gas generator there is no conductive connection between the latter and other vehicle parts, i.e., the gas generator is no longer grounded, a flexible grounding cable is arranged between the gas generator and ground in order to ground it.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 is a cross sectional view of an airbag module for a steering wheel according to an embodiment of the present invention.

FIG. 2 is a cross sectional view of detail Z from FIG. 1.

FIG. 3 is a perspective view of a gas generator with a plurality of retaining elements fitted to the circumference of the gas generator according to an embodiment of the present invention.

DESCRIPTION

Figure 4:
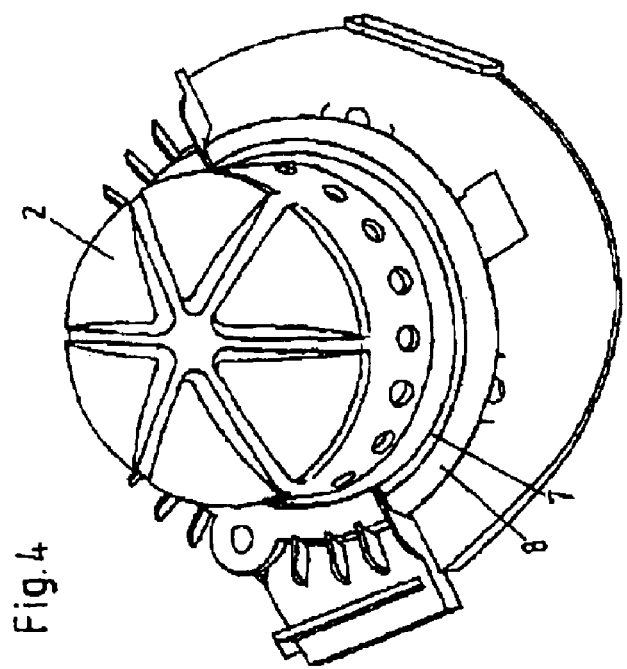
FIG. 4 is a perspective view of a gas generator with an annular, elastic subassembly according to an embodiment of the present invention.

FIG. 1 illustrates an airbag module 1 which has a cup-shaped gas generator 2, a diffuser housing 3 with apertures 4 for the escape of the gas generator gases, an airbag 5, and a covering cap 6. The gas generator is mounted elastically in the lower section of the airbag module. For this purpose, the gas generator has an annular flange 7 onto which an annular, elastic subassembly 8 (FIG. 4) or a plurality of segment-like, elastic subassemblies 9 (FIG. 3), for example made of silicone, may be injection molded. For the fastening of the segment-like, elastic subassemblies, it is possible, instead of the annular flange 7, also for flange segments to be arranged in the region of the elastic subassemblies.

The elastic subassemblies have the cross-sectional shape of a generally horizontal Y with an upper retaining element 10 running obliquely upward, i.e., obliquely in the direction of the covering cap 6, and with a lower retaining element 11 aforementioned direction. The retaining elements have a finger-shaped cross section. The diffuser housing 3 is fastened to a generator carrier 12 to which a retaining plate 13 is fitted from below. All three parts 3, 12, and 13 may be connected to one another in one working step by bolts 14 and nuts 15.

As shown in FIG. 2, the generator carrier 12 has a depression 16 in which the upper retaining element 10 engages. The retaining plate 13 has a depression 17 in which the lower retaining element 11 engages. During the installation of the parts 3, 12, and 13, the upper retaining element 10 is pressed onto the generator carrier 12, and the lower retaining element 11 is pressed onto the retaining plate 13, as a result of which a secure, elastic fastening of the gas generator is obtained.

Figure 5:
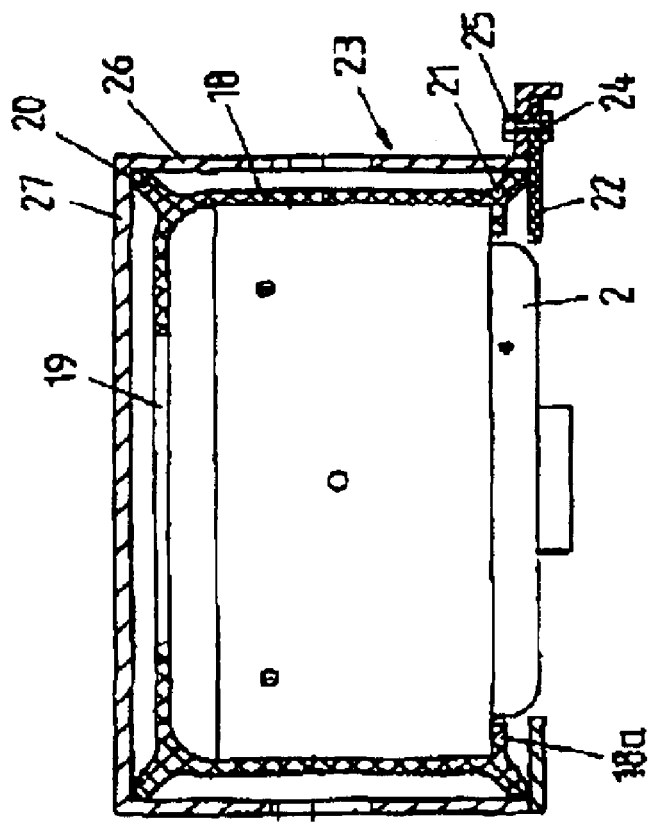
FIG. 5 is a cross sectional view through an airbag module with retaining elements fitted to the gas generator at the bottom and top according to an embodiment of the present invention.

As shown in FIG. 5, according to another embodiment of the present invention, the airbag module may include an elastic subassembly 18 which is in the form of a hood and is pulled over the gas generator 2. The subassembly 18 includes a section 18a that extends under the bottom of the gas generator, securely connecting the subassembly to the gas generator. The subassembly 18 includes at least one opening 19 for gases to escape after the gas generator 2 has been fired. The subassembly 18 has, in the lower section, a retaining element 21 which runs or extends obliquely downward, has a finger-like cross section and annularly surrounds the gas generator 2. In the upper section, the subassembly 18 has a retaining element 20 which runs obliquely upward, has a finger-like cross section and likewise annularly surrounds the gas generator 2. Instead of the annular retaining elements 20, 21, spaced apart segment-like retaining elements may be provided. The spaced apart retaining elements may be spaced at regular intervals around the gas generator 2 and the subassembly 18. FIG. 5 also depicts these segment-like retaining elements because the subassembly 18 has the same cross-section in the region of the spaced apart segments.

As shown in FIG. 5, the retaining elements 20, 21 interact with a retaining plate 22 and a diffuser housing 23, which are connected to each other by bolts 24 and nuts 25. During the installation, the gas generator 2, which is provided with the subassembly 18, is placed onto the retaining plate 22, and then covered by the diffuser housing 23. After connection of the diffuser housing 23 to the retaining plate 22, the lower retaining element 21 is pressed against the plate 22 and against the side wall 26 of the diffuser housing 23 while the upper retaining element 20 is pressed against the side wall 26 and the upper wall 27 of the diffuser housing 23. The gas generator 2 is thus mounted securely and elastically.

Figure 6:
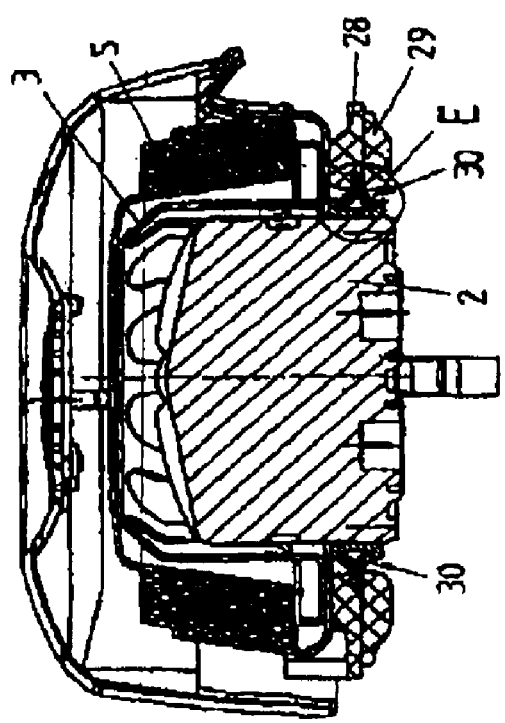
FIG. 6 is a cross sectional view of an airbag module with elastic retaining elements for the gas generator, which are fastened to the diffuser securing means, according to an embodiment of the present invention.
Figure 7:
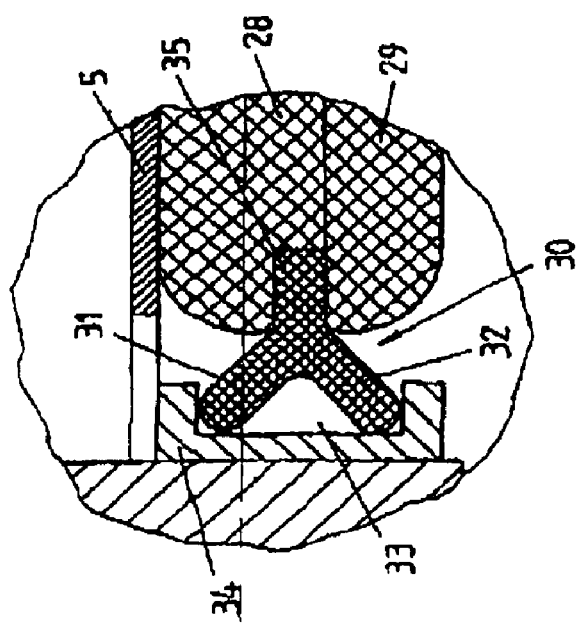
FIG. 7 is a cross sectional view of detail E from FIG. 6.

According to the embodiment of the present invention shown in FIG. 6, unlike in the preceding exemplary embodiments, the elastic subassemblies are fastened between a generator carrier 28 and a retaining plate 29. Four segment-like, elastic subassemblies are provided, of which two subassemblies 30 can be seen in FIG. 6. The subassemblies have a cross-sectional shape of a horizontal Y. As shown in FIG. 7, each elastic subassembly 30 has an upper retaining element 31 orientated obliquely upward and a lower retaining element 32 orientated obliquely downward. The retaining elements 31, 32 engage in a recess 33 of a retaining part 34 fastened to the gas generator 2. The elastic subassemblies also have a section 35 fastened between the generator carrier 28 and the retaining plate 29.

During assembly of the module, the gas generator 2 together with the elastic subassemblies 30 is placed onto the retaining plate 29. The generator carrier 28 and the diffuser housing 3 with the lower section of the airbag 5 interposed there-between, are then connected to the retaining plate 29 by screws and nuts (not shown). The elastic subassemblies 30 are thus anchored fixedly between the generator carrier 28 and the retaining plate 29, and the retaining elements 31 and 32 are pressed in the recess 33 fixedly onto the retaining part 34.

The priority document, DE 102 15 330.2, filed Apr. 3, 2002, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module for a steering wheel of a vehicle, the module comprising:
   a gas generator;
   an airbag;
   a covering configured to face a passenger compartment of the vehicle;
   an elastic subassembly for mounting the gas generator;
   wherein one end of the subassembly includes first and second retaining elements, the first retaining element extending obliquely upward toward the covering and the second retaining element extending obliquely downward away from the covering;
   wherein the other end of the subassembly contacts the gas generator and an end of the retaining elements contact another part of the airbag module, and
   wherein the retaining elements have a finger-shaped cross section.

2. The airbag module of claim 1, wherein the retaining elements contact a retaining plate.

3. The airbag module of claim 1, wherein the retaining elements contact a generator carrier.

4. The airbag module of claim 1, wherein the retaining elements contact a diffuser housing.

5. The airbag module of claim 1, wherein the retaining elements are fastened to the gas generator.

6. The airbag module of claim 1, wherein the first and second retaining elements are fastened to the another part of the airbag module.

7. The airbag module of claim 1, wherein the elastic subassembly includes a plurality of spaced apart elastic subassemblies.

8. The airbag module of claim 7, wherein the elastic subassemblies are evenly spaced apart.

9. The airbag module of claim 7, comprising at least three elastic subassemblies.

10. The airbag module of claim 1, wherein the elastic subassembly is annular.

11. The airbag module of claim 1, wherein the elastic subassembly has a cross-sectional Y-shape, and wherein the retaining elements comprise the obliquely running branches of the Y-shape.

12. The airbag module of claim 11, wherein the elastic subassembly is positioned in the airbag module so that a substantially vertical section of the Y-shape extends in a plane of a generator carrier or parallel to a plane of a generator carrier.

13. The airbag module of claim 1, wherein the first retaining element engages in a depression of a generator carrier, and the second retaining element engages in a depression of a retaining plate connected to the generator carrier.

14. The airbag module of claim 1, wherein the elastic subassembly is fastened to a flange connected to the gas generator.

15. The airbag module of claim 1, wherein the elastic subassembly comprises rubber or silicone.

16. The airbag module of claim 1, wherein the elastic subassembly is injection molded onto a flange connected to the gas generator.

17. The airbag module as claimed claim 1, wherein the elastic subassembly is connected to a generator carrier, and wherein the first and second retaining elements engage a recess on the gas generator.

18. The airbag module of claim 1, wherein the first retaining element is provided in an upper region of the airbag module, and wherein the second retaining element is provided in lower region of the gas generator.

19. The airbag module of claim 1, wherein the retaining elements are fastened to the gas generator, and wherein the first retaining element is arranged in an upper region of the airbag module and rests on a housing surrounding the gas generator, and wherein the second retaining element is arranged in a lower region of the gas generator and rests on a housing and on a retaining plate.

20. The airbag module of claim 1, wherein the elastic subassembly is configured to cover the gas generator.

21. An airbag module for a steering wheel of a vehicle, the module comprising:
   a gas generator;
   an airbag;
   a covering configured to face a passenger compartment of the vehicle;
   an elastic subassembly for mounting the gas generator;
   wherein one end of the subassembly includes first and second retaining elements, the first retaining element extending obliquely upward toward the covering and the second retaining element extending obliquely downward away from the covering;
   wherein the other end of the subassembly contacts the gas generator and an end of the retaining elements contact another part of the airbag module, and
   wherein the subassembly is fastened to the gas generator.

22. An airbag module for a steering wheel of a vehicle, the module comprising:
   a gas generator;
   an airbag;
   a covering configured to face a passenger compartment of the vehicle;
   an elastic subassembly for mounting the gas generator;
   wherein one end of the subassembly includes first and second retaining elements, the first retaining element extending obliquely upward toward the covering and the second retaining element extending obliquely downward away from the covering;
   wherein the other end of the subassembly contacts the gas generator, and
   wherein the first and second retaining elements are fastened to the another part of the airbag module.

23. An airbag module for a steering wheel of a vehicle, the module comprising:
   a gas generator;

an airbag;

a covering configured to face a passenger compartment of the vehicle;

an elastic subassembly for mounting the gas generator;

wherein the subassembly includes first and second retaining elements, each retaining element having first and second ends, the first retaining element extending obliquely upward toward the covering and the second retaining element extending obliquely downward away from the covering; and wherein the first ends of the retaining elements contact the gas generator and the second ends of the retaining elements contact another part of the airbag module, wherein the elastic subassembly has a cross-sectional Y-shape, and wherein the retaining elements comprise the obliquely running branches of the Y-shape.

24. An airbag module for a steering wheel of a vehicle, the module comprising:

a gas generator;

an airbag;

a covering configured to face a passenger compartment of the vehicle;

an elastic subassembly for mounting the gas generator;

wherein the subassembly includes first and second retaining elements, each retaining element having first and second ends, the first retaining element extending obliquely upward toward the covering and the second retaining element extending obliquely downward away from the covering; and wherein the first ends of the retaining elements contact the gas generator and the second ends of the retaining elements contact another part of the airbag module, wherein the elastic subassembly is fastened to a flange connected to the gas generator.

25. An airbag module for a steering wheel of a vehicle, the module comprising:

a gas generator;

an airbag;

a covering configured to face a passenger compartment of the vehicle;

an elastic subassembly for mounting the gas generator;

wherein the subassembly includes first and second retaining elements, each retaining element having first and second ends, the first retaining element extending obliquely upward toward the covering and the second retaining element extending obliquely downward away from the covering; and wherein the first ends of the retaining elements contact the gas generator and the second ends of the retaining elements contact another part of the airbag module, wherein the retaining elements are fastened to the gas generator, and wherein the first retaining element is arranged in an upper region of the airbag module and rests on a housing surrounding the gas generator, and wherein the second retaining element is arranged in a lower region of the gas generator and rests on a housing and on a retaining plate.

* * * * *